United States Patent Office 3,230,438
Patented Jan. 18, 1966

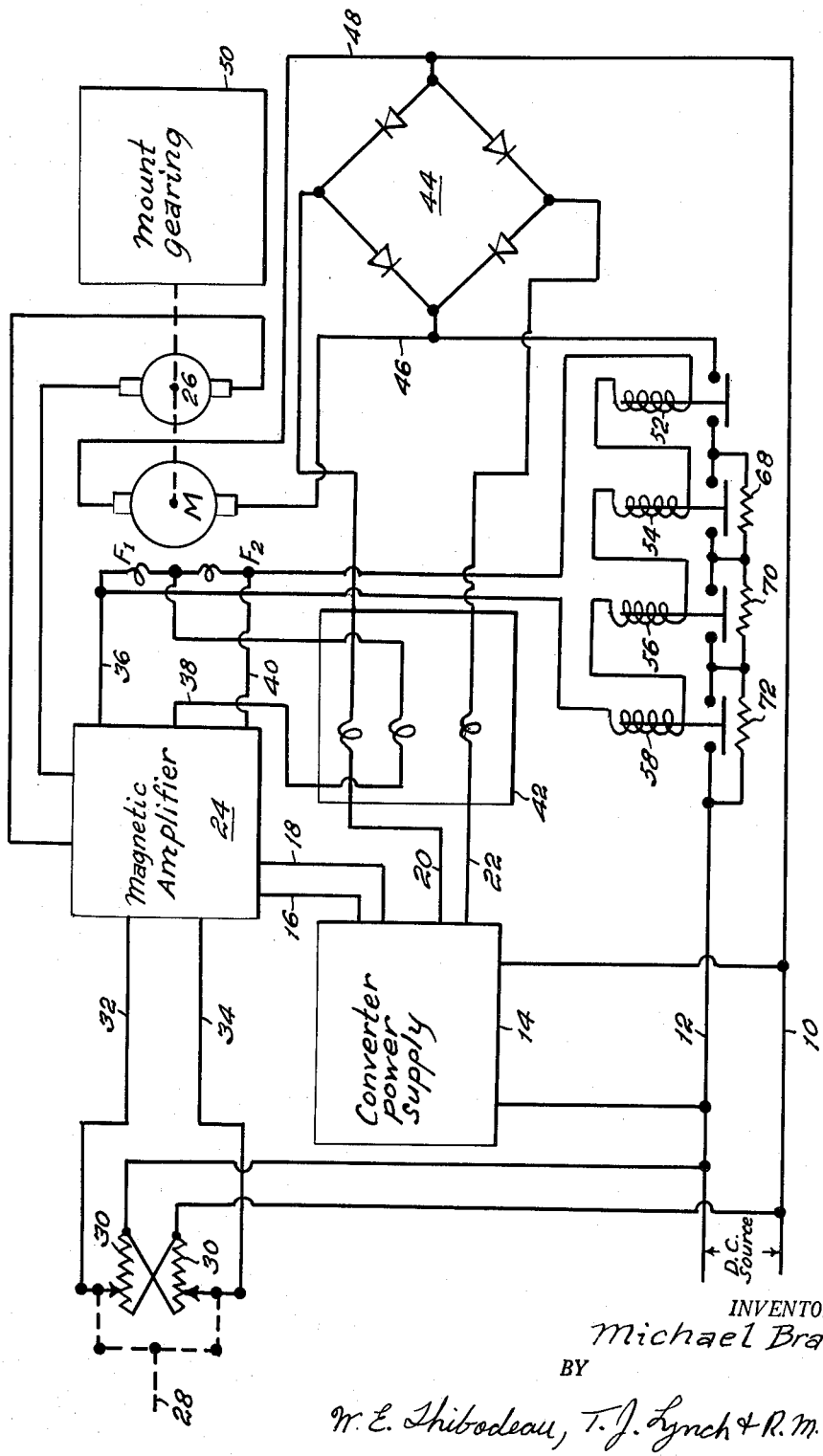

3,230,438
DUAL MODE MAGNETIC AMPLIFIER
SPEED CONTROL
Michael Bracutt, East Orange, N.J., assignor to the United States of America as represented by the Secretary of the Army
Filed Feb. 8, 1957, Ser. No. 639,141
5 Claims. (Cl. 318—388)

The invention relates to electric motor controls, particularly motor controls for direct current motors.

In the design of armored vehicles, it is often desired to provide electric drive means for gun turret rotation or elevation because of the ease of control available through an electrical system. It is to this type of application that the invention is especially suited, although not limited. As the guns of many turrets must be capable of fine adjustment where firing at a stationary target at long ranges and also capable of tracking a target moving at great speed, such as aircraft, the design of an electric motor control which will permit accurate and sensitive operation between these two exeremes becomes a problem, in that space and weight limitations of the vehicle mounting the turret restrict the size of the control components, and the shocks and jolts which the control system are subjected are too great for effective performance of a vacuum tube motor control system.

It is thus an object of the invention to design an electric motor control which is rugged enough to withstand extreme shock, yet will permit very accurate control of the speed and dirction of rotation of the motor.

Another object of the invention is to produce an electric motor control which uses one circuitry for lower speeds and automatically introduces additional circuitry for higher speeds and torques.

A further object of the invention is to design a motor control for a direct current motor which is concise, lightweight and is capable of exerting a momentary high torque and acceleration from a relative low power supply.

In the figure is shown a circuit embodying the invention.

As shown in the figure, the circuit is supplied from a direct current source through the conductors 10 and 12. The direct current available must be derived from the electrical system of the vehicle and may be about 24 volts, although the system is not limited to any particular voltage range. A converter 14 is connected across the direct current source to provide alternating current for the motor control elements and is provided with A.C. supply conductors 16, 18, 20, and 22. Converter 14 may be of any lightweight conventional type.

The fields of the controlled motor M are regulated by a magnetic amplifier 24, which is of the conventional saturable ferro-magnetic core type and is supplied with alternating current by the conductors 16 and 18. The amplifier 24 is sensitive to the speed of feed-back tachometer 26, which is mechanically driven by the motor, and the voltage generated by tachometer 26 is used to maintain a constant motor speed at a given setting. A hand operated control handle 28, which controls a pair of variable resistances 30, is used to vary the control voltage, which regulates the change in the output of amplifier 24. The resistances 30 are connected to supply conductors 10 and 12 whereby movement of handle 28 in a vertical or horizontal direction will increase or decrease the voltage within conductors 32 and 34 as well as change the polarity. A bridge type rectifier is incorporated in the amplifier 24 whereby the output conductors 36, 38 and 40 will supply direct current to the motor fields $F^1$ and $F^2$. The details of amplifier 24 are not shown as any conventional magnetic amplifier construction may be used wherein the above mentioned functions may be produced.

The armature current is controlled by a saturable reactor 42 in which the field conductor 38 comprises the bias winding. The conductors 20 and 22 supply the alternating current to reactor 42 and continue on to a bridge rectifier 44, thus the voltage supplied to rectifier 44 will be regulated by the current flow of conductor 38. Preferably, rectifier 44 is of the selenium type and is connected across the armature of motor M by means of conductors 46 and 48.

Thus the motor armature current will be controlled by the magnitude of the current flow of conductor 38 through the saturable reactor 42, thereby controlling the speed of the motor. The direction of motor M rotation will be determined by the polarity of conductors 32 and 34, which in turn determine whether field $F^1$ or $F^2$ will be energized. The tachometer 26 maintains the motor speed constant for a given position of control handle 28 thereby providing a precise motor speed regulation. Motor M is mechanically linked to the turret mount gearing 50 whereby rotation of motor M will cause the gun turret to rotate in the desired direction.

The above motor circuitry will provide an accurate motor control within the normal operating conditions required of the motor whereby the gun upon the controlled turret may be aimed at stationary targets or targets moving at a moderate speed. However, when tracking a fast moving target such as an airplane, momentary acceleration and torque is required which is greater than the capacity of the control system so means are provided to introduce a second mode of circuitry to permit rapid acceleration.

The second circuit mode consists of a series of relays—52, 54, 56 and 58—which are connected in series across the motor fields $F^1$ and $F^2$. Resistances 68, 70 and 72 bypass relays 54, 56, and 58 respectively whereby reduced current may be supplied to relay 52 though relays 54, 56 and 58 may be open.

As will be observed from the drawing, the relays act on supply conductor 12 and conductor 10 connects to line 48, thus if all the relays 52–58 are closed, the armature of motor M will receive the current of the original direct current source. Relays 52–58 are of overload closing type whereby the relays will close upon the voltage in the coils reaching a predetermined value.

Therefore, if the control handle 28 is rapidly moved in one direction or in the other faster than the first mode circuitry can produce the desired motor acceleration, the increased field voltage will close relays 52–58 imposing additional current upon the armature of motor M creating additional torque and acceleration. The relays 52–58 are adjusted such that the number of relays which close is proportional to the value of the motor field voltage, thus between one and four relays will be closed during the second mode of control, however relay 52 will always have to be closed first. Thus it will be observed that extra current may be imposed on the motor armature to provide the extra acceleration required to track rapid moving targets.

This type of motor control circuit is especially advantageous where rapid sensitivity is desired in the lower speed ranges as the use of the magnetic amplifier and field controlled saturable reactor permit the field current and armature current to build up simultaneously to provide motor torque in proportion to the product of field flux and armature current thereby involving only one time constant. Since the armature current is determined by input current of the bias winding of the saturable reactor the armature current will be substantially independent of the voltage of the bias winding or motor field.

The bridge type rectifier 44 is an important contribution to the circuit as this design will provide dynamic braking by short-circuiting the armature in the event of sudden field reversal. For instance, if the motor is operating at full speed in one direction, and suddenly the reverse field is energized, the motor will act as a generator and increase the armature current before it has had time to reverse, under this condition the bridge rectifier essentially short circuits the armature, dynamically braking the motor. The selenium rectifiers are capable of withstanding this high momentary overload and the bridge circuit prevents upsetting the operating bias of the saturable reactor during the dynamic braking phase avoiding a severe plugging condition which could occur if circulating current thoroughly saturated the reaction and the line voltage added to the generated voltage during reversal.

The use of motor field voltage to operate the second mode relays, rather than field current, will give a more rapid response to greater torque demands as field voltage will lead field current.

The described motor control circuitry is especially suited for applications wherein weight and space limitations are critical as the dual mode control permits control components to be small in size and power rating. The circuit reduces roughness due to armature slot effect, therefore smooth low-speed operation can be attained as the system can operate at low levels of field strength. Standby excitation is very low, and magnetic amplifiers have a higher efficiency than vacuum tubes. No filament heating power is required and the only internal power losses, due to rectifier forward resistance and winding resistance, are very small. It is thus seen that the invention produces a motor control capable of fine speed regulation, yet will produce momentary higher torque and acceleration permitting a wide range of operating conditions. By the use of a magnetic amplifier and saturable reactor system delicate electronic tubes are eliminated from the motor control resulting in a rugged construction capable of installation in vehicles subject to severe shocks and bumps.

It is understood that various modifications to the illustrated embodiment may be apparent to those skilled in the art without departing from the spirit and scope of the invention, and it is intended that the invention be confined only by the following claims.

I claim:

1. In a control for a direct current motor, in combination, a direct current motor having an armature winding and a field winding, a magnetic amplifier and rectifier supplying said field windings with direct current, control means regulating the output of said magnetic amplifier, a saturable reactor said saturable reactor having alternating current primary windings and a direct current bias winding, said bias winding being connected to said motor field winding, a bridge type rectifier supplied by said primary windings, the direct current terminals of which are connected to said motor armature winding and relay means controlled by the voltage of said field winding, said relay means allowing a direct current surge upon said armature winding upon obtaining a predetermined voltage on activation by the voltage of said field winding.

2. In an electric control system for a direct current motor, in combination, a direct current motor having an armature winding and field winding, a magnetic amplifier and rectifier connected to said field winding for control thereof, a manually operated control capable of introducing a control voltage into said magnetic amplifier, a saturable reactor comprising primary and bias windings, said bias winding connected in series to said field winding, a bridge type rectifier connected across the output of said primary reactor windings, said bridge rectifier being connected to said armature winding, supply terminals providing alternating current to said amplifier and said reactor and relay means activated by the motor field voltage for supplying a surge of direct current to the motor armature upon said relay obtaining a predetermined voltage.

3. In an electrical control system for a direct current motor, in combination, direct current supply terminals, a direct current motor comprising a field winding and an armature winding, a magnetic amplifier and rectifier connected to said field winding, a converter connected to said terminals supplying alternating current to said magnetic amplifier, a manually operated control voltage regulating the output of said magnetic amplifier, a saturable reactor supplied with alternating current from said converter, primary and bias windings within said reactor, said bias winding connected in series with said field winding, a bridge type rectifier receiving the output current of said reactor, said armature winding connected to said bridge rectifier, a conductor connecting said direct current terminals to said armature windings and a relay controlled by the voltage of said field winding interposed in said conductors whereby an additional direct current potential may be imposed on said armature winding upon activation of said relay by said field voltage obtaining a predetermined value on regulation of the output from said amplifier to said field winding through said manual control.

4. In an electric control system for a direct current motor, in combination, a direct current motor having a field winding and an armature winding, direct current supply terminals, a magnetic amplifier and rectifier controlling the current within said field winding, a manually operated control adapted to transmit a direct current control voltage to said amplifier, a saturable reactor consisting of primary and bias windings, a converter connected to said direct current terminals, said converter supplying alternating current to said magnetic amplifier and said primary winding, said bias winding connected in series to said field winding, a bridge type rectifier receiving the output of said saturable reactor, conductors connecting the output of said bridge rectifier to said armature winding, means for connecting said terminals to said armature winding and a series of staggered relays responsive to the field voltage controlling said means whereby a direct current surge may be impressed in said armature winding upon said field voltage acquiring a predetermined value.

5. In an electric control system as in claim 4 wherein said relays are connected in series across the field winding and further comprising resistances bypassing all but one of said relays whereby the magnitude of the direct current surge will be determined by the number of relays which are activated by said field voltage.

No references cited.

ORIS L. RADER, *Primary Examiner.*

NORMAN H. EVANS, *Examiner.*

S. GORDON, D. G. REDINBAUGH, *Assistant Examiners.*